UNITED STATES PATENT OFFICE.

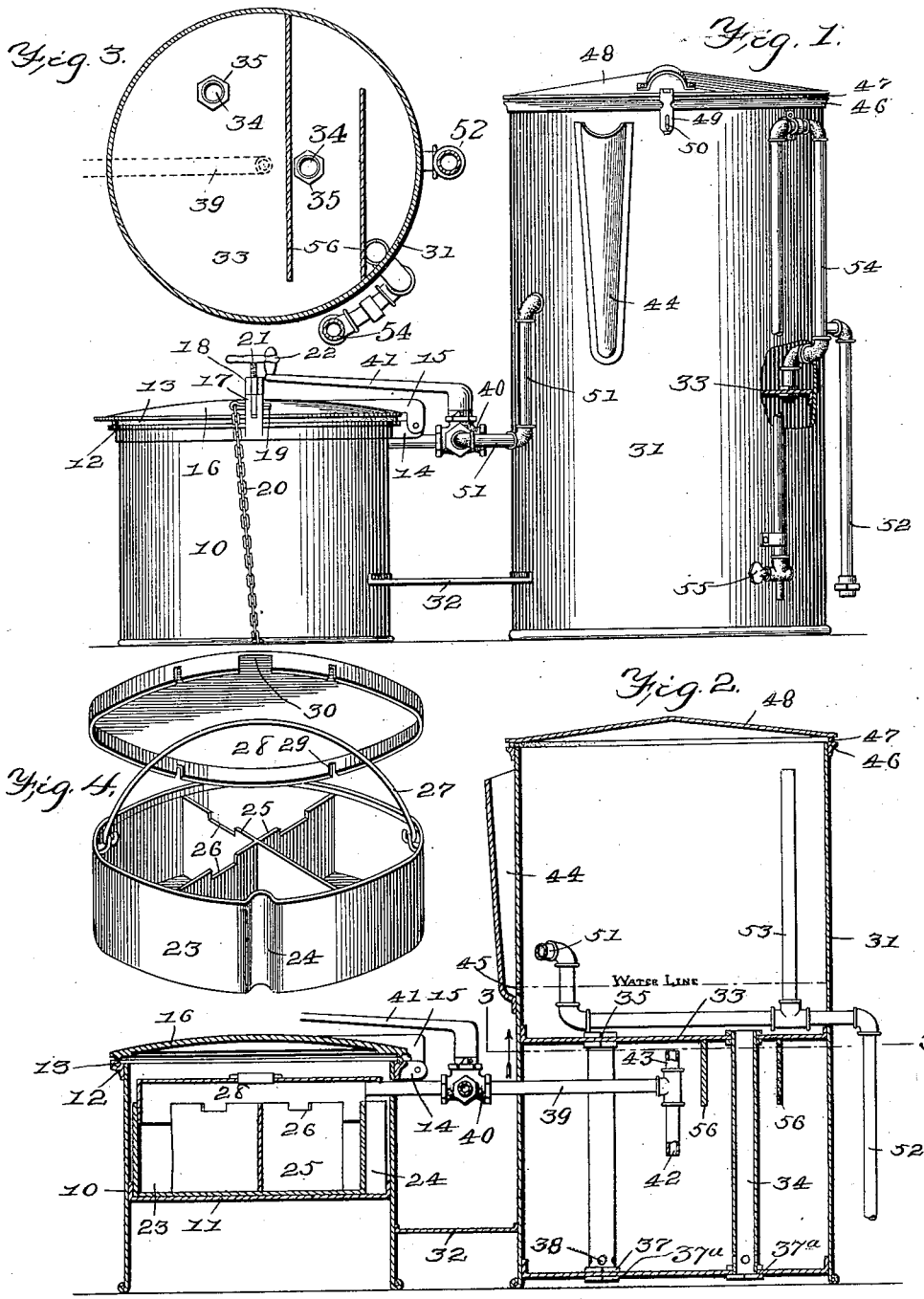

DAVID D. HARGER, OF DES MOINES, IOWA, ASSIGNOR, BY DIRECT AND MESNE ASSIGNMENTS, TO THE HARGER-SOUERS MANUFACTURING COMPANY.

ACETYLENE-GAS GENERATOR.

SPECIFICATION forming part of Letters Patent No. 650,388, dated May 29, 1900.

Application filed August 12, 1899. Serial No. 727,036. (No model.)

*To all whom it may concern:*

Be it known that I, DAVID D. HARGER, a citizen of the United States, residing at Des Moines, in the county of Polk, State of Iowa, have invented a new and useful Acetylene-Gas Generator, of which the following is a specification.

One of the objects of this invention is to provide an acetylene-gas generator especially designed for use in connection with locomotive-headlights or in places where the generator is subjected to considerable shaking or agitation, which generator shall be of simple, strong, durable, and inexpensive construction and in which there is no valve for regulating the flow of either the water or the gas.

A further object is to provide a generator in which the carbid-chamber is so constructed and arranged with relation to the water-supply that only a portion of the carbid will be subjected to the action of the water at a time and the remaining sections be reached only after each successive section has been fully consumed, and, further, in this connection to provide a carbid-chamber in which all of the condensation caused during the generation of the gas will accumulate on the cover and drop immediately into the generating-chamber, thus preventing the accumulation of water at the base of the chamber.

A further object is to provide such connection between the carbid-chambers and the receiver that will prevent the water in the receiver from entering the generator by splashing and yet readily conduct the water when on account of slight gas-pressure in the receiver the water rises as high as the connecting-pipe, and, furthermore, as soon as the water is thus passed into the carbid-chamber and the generation of gas has started the gas will force the water back into the receiver, thus effectually preventing an excessive supply of water. In this connection a further object is to provide simply means whereby it is made impossible to open the carbid-chamber without first shutting off the flow of the water to the carbid-chamber and of gas to the receiver and opening the blow-off pipe for the escape of the gas and odor in the carbid-chamber.

A further object is to provide simple and automatic means whereby upon the excessive generation of gas the surplus may blow off into the outside atmosphere to avoid explosion and without affecting in any way the operation of the generator.

A further object is to provide simple and inexpensive means for cooling the gas and removing, as nearly as may be possible, the water of condensation therefrom before entering the supply-pipe.

A further object is to provide convenient means for supplying the generator with water and for automatically discharging any surplus water that may be provided, so that the proper quantity for effective operation may easily be maintained within the apparatus, and, further, in this connection to prevent the flow of water to the generator through the blow-off pipe.

A further object is to provide a simple and improved construction of the means for providing water communication between the upper and lower compartments of the receiver, whereby the apparatus is strengthened and the sediment prevented from accumulating in the pipes.

A further object is to provide a generator of this class in which the odor arising from the water in the receiving-chamber is confined in the machine and yet the formation of a vacuum in this chamber is avoided.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a side elevation of the complete apparatus, part of the receiving-tank being broken away to illustrate the arrangement of the supply-pipe within the tank. Fig. 2 shows a vertical sectional view of the complete device. Fig. 3 shows an inverted sectional view through the indicated line 3 3 of Fig. 2. Fig. 4 shows in perspective the carbid-chamber and the cover therefor.

Referring to the accompanying drawings, I will first describe the carbid-chamber and next the receiving-chamber.

The reference-numeral 10 is used to indicate the carbid-chamber, which is preferably cylindrical in shape and provided with the bottom 11 and with an outwardly-projecting flange 12 at its top, having a groove therein for the reception of a rubber gasket 13. On the edge of this chamber, adjacent to the receiving-tank, the lugs 14 are fixed to receive a projection 15 from the cover 16 for the purpose of forming a hinged joint. At opposite sides of the carbid-chamber 10 are the lugs 17, to one pair of which the bar 18 is hinged, and a key 19 is provided at the end of a chain 20, whereby the other end of the bar 18 may be secured to the remaining pair of lugs 17.

A screw 21 is seated in the central portion of the bar 18 and is provided with a cross-head 22 at its top, whereby it may be turned to force the cover 16 downwardly into engagement with the gasket 13. This cross-head also serves another important function, to be made clear hereinafter. Within the frame thus formed is the carbid-holder proper, comprising a cylindrical bucket 23, open at its top and designed to enter and fill the interior of the said frame. At its one side is a depression 24, and on its interior are two vertical partitions 25 at right angles to each other, thus forming the interior into four separate compartments. In each side of each partition and at the top thereof is a notch 26, except in the one partition adjacent to the depression 24. The bail 27 is secured to the interior of the bucket and is capable of folding on top of the partitions within the bucket. On the cover 28 is a downwardly-projecting flange, which flange enters within the said bucket 23 and is provided with notches 29 to admit the edges of the partitions 25. It has also a notch 30 to admit the pipe for supplying water to the chamber, as hereinafter stated. By thus placing the flange of the cover within the bucket the water of condensation that gathers upon the cover must drop off into the bucket.

The receiving-tank (indicated by the reference-numeral 31) is located adjacent to the carbid-chamber and is connected therewith by means of a rigid brace 32 at its lower end. A slight distance beneath the central portion of the tank 31 is a partition or diaphragm 33, made gas-tight, and extended through this partition is one or more pipes 34. These pipes are connected with the partition by means of the lock-nuts 35 above and below the partition, and they are also connected with the bottom of the tank by means of the lock-nuts 37 above the said bottom and the screw-caps 37ª below said bottom. A number of openings 38 are formed in these pipes at a point near their lower ends and of such a size as to admit a quantity of water equal to the capacity of the pipes. The carbid-chamber and the lower portion of the receiving-tank are connected by means of a straight pipe 39. This pipe projects through the frame 10 a slight distance into the interior of the same. A depression 24 is provided in one side of the bucket 23 for the purpose of permitting the bucket to be raised or lowered in the frame without striking this projecting pipe. The bucket is turned slightly after being placed in the frame. The opening 30 in the cover of the bucket is provided to admit the pipe 39. This pipe is the only connection between the carbid-chamber and the receiving-tank, and through it both the water and gas flow. Located between the tank and chamber is a three-way valve 40, the lever for controlling which (indicated by the numeral 41) is made to project, when the valve is opened, to a point adjacent to the cross-head 22, so that before the cross-head may be turned as required to open the carbid-chamber the said lever must be turned a slight distance, and, further, the cover 16 by being hinged at the side adjacent to the receiving-tank makes it necessary to turn the lever 41 before the said cover may be raised. Hence the carbid-chamber cannot be opened when the pipe 39 is opened, and for this reason no water can flow into the carbid-chamber nor any gas be produced therein when the cover is open. At the point near the central portion of the lower chamber in the tank 31 a pipe 42 projects downwardly from the pipe 39 a short distance and the pipe 43 projects upwardly a short distance. By means of this pipe 42 the splashing of water in the lower chamber of the tank 31 is prevented from entering the pipe 39, for in the central portion of the chamber there is not so much splashing and because the pipe 42 projects down into the water. Hence no water can pass through the pipe 39 until the water-level reaches up to the pipe 39, and when the generation of gas takes place any water in the pipe 39 is forced through it into the lower compartment until the pipe 39 is cleared, and then the gas passes up through the pipe 43.

At one side of the chamber, above the partition 33, is a funnel 44, communicating through the opening 45 with the said upper chamber. The water is poured into this funnel until it reaches the water-lines indicated by the dotted lines in Fig. 2, where it may be seen by the operator. At the top of the tank 31 is a flange 46 for supporting the gasket 47, and a cover 48 is placed on top of this gasket to form a gas-tight joint for the top of the tank and to prevent the escape of the odor arising from the water. This cover is securely held in place by means of hinged metal strips 49, which overlap the staples 50 at the side of the tank.

Connected with the aforesaid three-way valve 40 is a blow-off pipe 51. This pipe enters the upper chamber of the tank 31 and is then bent downwardly and finally horizontally through the tank and then downwardly at 52 to a point of discharge. On the interior of the chamber 31 is a straight pipe 53 to project upwardly to a point near the top of the upper chamber. The service-pipe (indicated by the reference-numeral 54) extends upwardly from the partition or diaphragm 33, and then outwardly through the side of the tank 31, and then upwardly, and finally downwardly, where the valve 55 is provided, to which the service-pipe is attached.

On the under surface of the partition or diaphragm 33 and between the pipe 43 and the pipe 54 I have provided a series of deflectors 56, connected with the under surface of the partition or diaphragm 33 to project downwardly a slight distance into the lower compartment. These deflectors are attached at one end to the side of the tank and extended to a point near the opposite side, and they are arranged in this manner on alternate sides within the tank. Obviously when the water is at or near a level with the pipe 39 a passage-way will be provided, through which the gas must pass from the generator to the supply-pipe, and during its flow through this passage-way it must come in contact with the water and be thereby cooled, thus avoiding the necessity and expense of coiled pipes for this purpose.

In practical operation and assuming that the various compartments of the carbid-chamber have been filled with carbid the three-way valve 40 is closed, so that no water may enter the carbid-chamber. Then the water is poured in the funnel 44 until it reaches the water-line. Obviously the entire lower compartment will be filled and part of the upper compartment. When this has been done, then the valve 40 is opened, and immediately the water flows into the carbid-chamber and the generation of gas begins. When a sufficient pressure of gas is obtained, it will force the water through the pipe 39 until the pipe is clear and will then enter the lower compartment of the tank 31. As the pressure of the gas increases the water in the lower compartment will be forced downwardly in the compartment and will escape through the pipes 34 into the upper compartment, and when the water-line in this upper compartment reaches the top of the pipe 53 it will flow into the pipe 53 and discharge through the pipe 52. The water is prevented from entering the pipe 51 by reason of the upward bend in said pipe. When this is done, the proper quantity of water for the best operation of the machine is found within the tank 31. When the pressure of the gas decreases, the water will rise in the lower compartment until it enters the pipe 39 and passes to the carbid-chamber, whereupon the above operation will be continued. By reason of the said deflectors 56 the gas is made to pass from the pipe 43 through a tortuous passage-way and in contact with the water before it enters the service-pipe 54, thus cooling the gas and permitting the greater portion of the water of condensation to be separated from the gas. As the process of gas generation continues the first chamber of the carbid-bucket will become filled with water, whereupon the overflow will pass through the notch 26 into the adjacent section of the carbid-chamber, and this section will in turn be utilized. By reason of the peculiar shape of the service-pipe 54 any water of condensation that may enter the pipe will be permitted to flow backwardly through the pipe and drop into the lower compartment of the tank to thereby provide a gas which will be as dry as may be made and to prevent the siphonage of the water. When it is desired to refill the carbid-chamber, it is necessary before the cover of the carbid-chamber may be raised and before the cross-head 22 may be turned at all to move the lever 41 out of position, whereby it will contact with the said cross-head. By this means the flow of the water into the carbid-chamber and the flow of gas into the receiving-tank are positively prevented before the top may be opened, and, furthermore, if this lever 41 is not turned to a position to fully close the valve the opening of the cover 16 will move the lever 41 into its closed position. When the valve is in this closed position, it is obvious that the gas and odor in the carbid-chamber may readily pass into the upper chamber of the receiver. Assuming that too much water has been admitted into the carbid-chamber and the gas generated more rapidly than it can be taken off by the supply-pipe, it is obvious that the gas-pressure in the lower chamber will force all of the water in the chamber upwardly through the pipes 34, and then when there is no more water left in the lower chamber the gas will obviously pass through the water into the space above the water in the upper compartment, and when it reaches the top of the upper compartment it may enter the escape-pipe and be discharged into the outer air without danger of creating an excessive pressure at any point in the apparatus. The pipe 53 also serves the further function of preventing the formation of a vacuum in the upper chamber when the water recedes therefrom, because air may pass through the pipes 52 and 53 into the upper chamber freely.

Having thus described my invention, what I claim, and desire to secure by Letters Patent of the United States therefor, is—

1. In an acetylene-gas generator, the combination of a carbid-chamber, a receiving-chamber divided into upper and lower compartments, a pipe leading from the lower portion of the upper compartment, to the lower portion of the lower compartment and communicating therewith, and a single open pipe leading from the carbid-chamber into the upper portion of the said lower compartment to a point near the center thereof, a short branch leading downwardly from the end of said pipe within the compartment, and a short branch leading upwardly from the said pipe, for the purposes stated.

2. In an acetylene-gas generator, the combination, of a receiving-chamber having upper and lower compartments, a carbid-chamber adjacent thereto, a hinged cover for the carbid-chamber to swing toward the receiving-chamber when opened, a bar attached to the sides of the carbid-chamber and overlapping said cover, a pipe leading from the carbid-chamber to the receiving-chamber, a branch pipe leading from said pipe from between the generator and receiver communicating with the upper chamber of receiver, and with the outside air, a three-way valve at the juncture of these pipes, a lever connected with said three-way valve, the said lever projecting over the cover, whereby, when the cover is moved on its hinge, the said lever will be turned away from the cover and operate the three-way valve to close communication with the lower portion of the receiving-chamber, and open communication to the upper portion thereof, and to the outside air.

3. In an acetylene-gas generator of the class having a receiving-tank divided into upper and lower compartments and a pipe for providing communication between them, the combination of a pipe leading into the tank below the central partition, a service-pipe leading from the tank and a series of deflectors secured to the under surface of the central partition, and extended downwardly a short distance therefrom, the series of deflectors leading from opposite sides and extending only part way across the tank, the said deflectors being situated between the inlet and service pipes so that a tortuous passage-way is provided for the gas with the water in the tank to close the bottom of the passage-way and to aid in cooling the gas, substantially as and for the purposes stated.

4. The combination in an acetylene-gas generator of the class described having a generator and a receiver, of the pipe 39, a three-way valve 40, the branch pipe 51 extended upwardly from the pipe 39, then into the lower compartment of the receiver, then downwardly and then horizontally, a pipe 52 connected therewith, a pipe 53 connected with the pipe 51 within the upper compartment, substantially as and for the purposes stated.

DAVID D. HARGER.

Witnesses:
Z. G. ROE,
J. RALPH ORWIG.